United States Patent
Brendel

(10) Patent No.: US 6,912,046 B2
(45) Date of Patent: Jun. 28, 2005

(54) INSTRUMENT MEASURING CHROMATIC DISPERSION IN OPTICAL FIBERS

(75) Inventor: Jürgen Brendel, Geneva (CH)

(73) Assignee: Sunrise Luciol Sarl, Mies (CH)

( * ) Notice: Subject to any disclaimer, the term of this patent is extended or adjusted under 35 U.S.C. 154(b) by 107 days.

(21) Appl. No.: 10/344,922

(22) PCT Filed: Aug. 16, 2001

(86) PCT No.: PCT/IB01/01491

§ 371 (c)(1),
(2), (4) Date: Feb. 18, 2003

(87) PCT Pub. No.: WO02/16901

PCT Pub. Date: Feb. 28, 2002

(65) Prior Publication Data

US 2004/0046964 A1 Mar. 11, 2004

Related U.S. Application Data

(60) Provisional application No. 60/227,437, filed on Aug. 22, 2000.

(51) Int. Cl.[7] .............................................. G01N 21/00
(52) U.S. Cl. ..................................................... 356/73.1
(58) Field of Search ...................... 356/73.1; 398/9–38; 250/227.18–227.23; 385/123–126, 24–27, 100

(56) References Cited

U.S. PATENT DOCUMENTS

| | | |
|---|---|---|
| 4,551,019 A | 11/1985 | Vella |
| 4,752,125 A | 6/1988 | Schicketanz |
| 4,799,789 A | 1/1989 | Tsukamoto et al. |
| 5,033,846 A | 7/1991 | Hernday et al. |
| 5,189,483 A | 2/1993 | Inagaki |
| 5,406,368 A | 4/1995 | Horiuchi et al. |
| 5,557,694 A * | 9/1996 | Veith et al. .................... 385/27 |
| 5,619,320 A | 4/1997 | Jopson et al. |
| 5,724,126 A * | 3/1998 | Nishi et al. ................. 356/73.1 |
| 5,798,853 A | 8/1998 | Watanabe |
| 5,969,806 A * | 10/1999 | Bergano ..................... 356/73.1 |

FOREIGN PATENT DOCUMENTS

| | | |
|---|---|---|
| EP | 0 280 329 A | 8/1988 |
| JP | 10 307077 A | 11/1998 |
| JP | 2000 081374 | 3/2000 |
| JP | 2000 193558 | 7/2000 |

* cited by examiner

Primary Examiner—Tu T. Nguyen
(74) Attorney, Agent, or Firm—Bugnion S.A.; John Moetteli

(57) ABSTRACT

An instrument for measuring chromatic dispersion in optical fibers. The instrument comprises two independent modules, an optical source (2') and a receiver (4'). The optical source (2') comprises two pulse producing circuits: one driving a laser (35), which will be used as a timing reference, and the second driving a light emitting diode (LED)(34), emitting a short light pulse with a broad spectrum. The receiver (4') comprises a wavelength-selection element (46), which filters one or several wavelengths out of the LED spectrum, a photodetector (43) for detection of the laser pulse, a photon-counting detector (41) for detection of the filtered LED pulses, and a high-resolution timing circuit (42) for measuring the time delay between the laser pulse and the LED pulse. A preferred embodiment includes the wavelength-selection element (46) which is a series of Bragg gratings, thus selecting several fixed wavelengths.

21 Claims, 3 Drawing Sheets

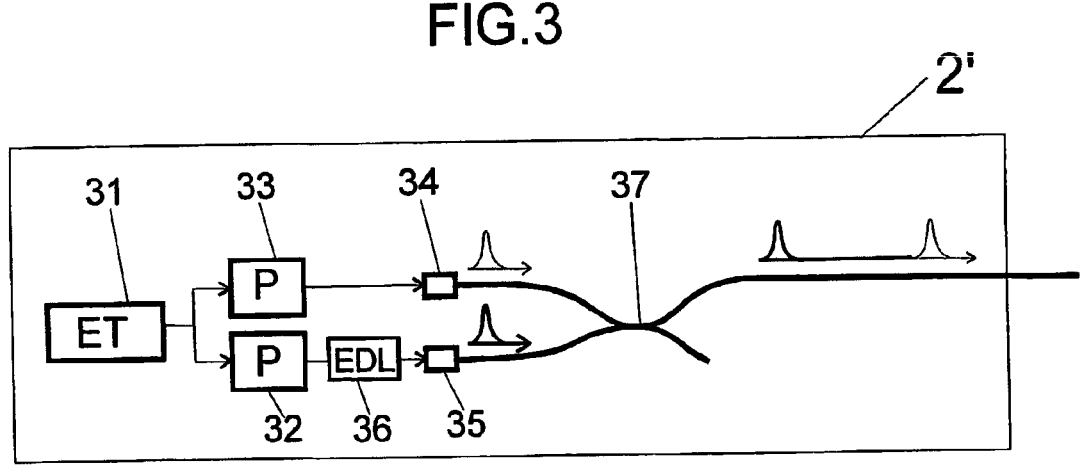
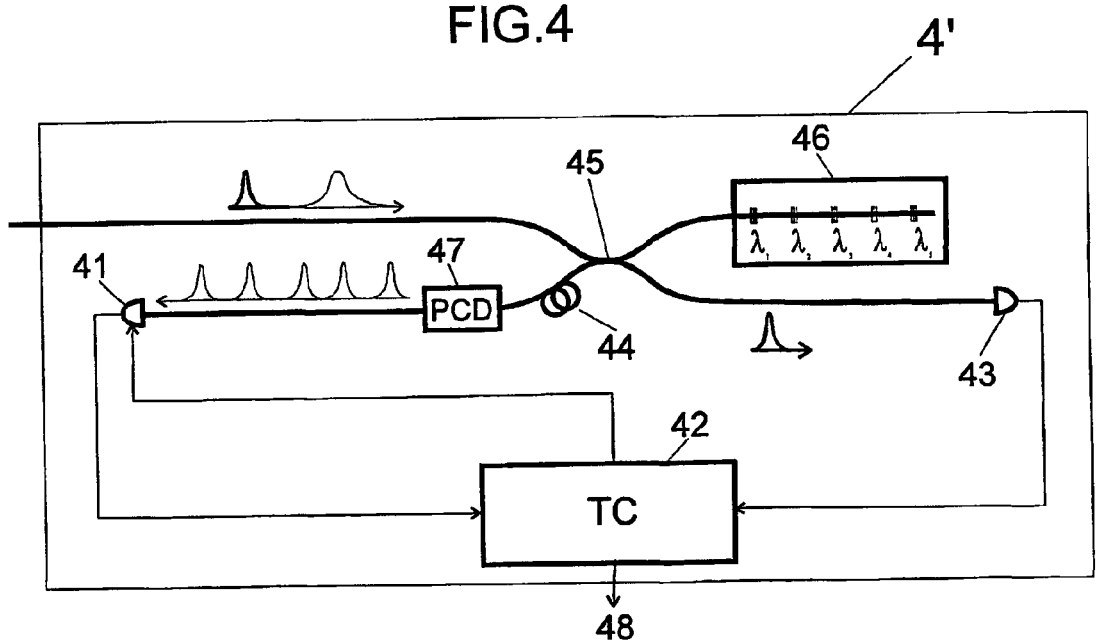

INSTRUMENT MEASURING CHROMATIC DISPERSION IN OPTICAL FIBERS

This application claims the benefit of Provisional Application No. 60/227,437, filed Aug. 22, 2000.

BACKGROUND OF THE INVENTION

This invention relates generally to the field of optical telecommunications, and more particularly to an instrument for measuring chromatic dispersion in optical fibers.

In general, all optical waveguides, and optical fibers in particular, exhibit dispersion. Dispersion generates a temporal broadening of optical pulses, which are the information carriers in optical telecommunications. This ultimately limits the transmission rate of the channel: the pulses overlap, and the ability to separate them is lost. In single-mode optical fibers the main factor of dispersion is chromatic dispersion: each frequency, or wavelength (i.e. color in the visible domain), propagates at a slightly different velocity. Since an optical pulse is built of a range of wavelengths, each of them propagating at a different velocity, chromatic dispersion is the main factor causing broadening of the pulses. Measuring chromatic dispersion in optical fibers, and compensating it with so-called chromatic dispersion compensators has become an essential issue.

In its recommendation ITU-T G.650, the International Telecommunication Union proposes three possible techniques for measuring the chromatic dispersion coefficient, which characterizes chromatic dispersion: the phase shift technique; the interferometric technique; and the pulse delay technique. For all these techniques, the chromatic dispersion coefficient is derived from a measurement of the relative group delay experienced by various wavelengths during propagation through a known length of fiber. The interferometric technique is designed for measurements of short lengths of fibers (having a length of meters). It is not adapted to long fibers (several kilometers) and installed cables, which is the domain addressed by the invention. Therefore, it will not be discussed further.

In the phase shift technique, which has been chosen as the reference technique, the group delay is measured in the frequency domain, by detecting, recording and processing the phase shift of a sinusoidal modulating signal. This method and some variations are used in all available commercial instruments, and are covered by several patents (references: U.S. Pat. No. 5,033,846 by Hernday et al., U.S. Pat. No. 5,406,368 by Horiuci et al.). This technique allows the most precise determination of the group delay (to the sub-picosecond), but requires delicate and expensive instruments.

The third method, based on a direct measurement of the group delay, has not yet found its way into commercial practice because it is difficult to combine in a satisfactory way the three main ingredients required: (1) fast optical pulses, either tunable or with a large spectrum; (2) fast detection, sensitive enough to detect the pulses; and (3) high resolution timing circuit.

Therefore, what is needed is a device and/or method of accurately measuring the chromatic dispersion coefficient over long distances which does not require delicate or expensive instruments.

SUMMARY OF THE INVENTION

An instrument is provided for measuring chromatic dispersion in optical fibers. The instrument comprises two independent modules, an optical source and a receiver. The optical source comprises two pulse producing circuits: one driving a laser, which will be used as a timing reference, and the second driving a light emitting diode (LED), emitting a short light pulse with a broad spectrum. The receiver comprises a wavelength-selection element, which filters one or several wavelengths out of the LED spectrum, a photodetector for detection of the laser pulse, a photon-counting detector for detection of the filtered LED pulses, and a high-resolution timing circuit for measuring the time delay between the laser pulse and the LED pulse.

The primary object of the invention is to provide a chromatic dispersion analyzer for optical fibers with two independent modules: a source and a receiver. The source and the receiver are only connected via the fiber under test, and need no extra communication between them.

Another object of the invention is to provide high-speed measurement of chromatic dispersion.

Another object of the invention is to provide an instrument with high dynamic range.

A further object of the invention is to have a small lightweight source, with low power consumption, so as to allow a battery-powered option.

Yet another object of the invention is to allow a cost efficient multi-source configuration, with interchangeable sources.

In accordance with a preferred embodiment of the present invention, an instrument for measuring chromatic dispersion in optical fibers comprises:

an optical source, including two pulse producing circuits: one driving a laser, which will be used as a timing reference; and the second driving a light emitting diode (LED), emitting a short light pulse with a broad spectrum;

a receiver including a wavelength-selection element, which filters one or several wavelengths out of the LED spectrum; a photodetector for detection the laser pulse; a photon-counting detector ("PCD") for detection of the filtered LED pulses; and a high resolution timing circuit for measuring the time delay between the laser pulse and the LED pulse;

and a counting circuit, for recording the time delays for a large number of pulses.

Other objects and advantages of the device will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 is a schematic diagram illustrating the operation of the optical source of another embodiment of the instrument.

FIG. 4 is a schematic diagram illustrating the operation of the receiver of another embodiment of the instrument.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
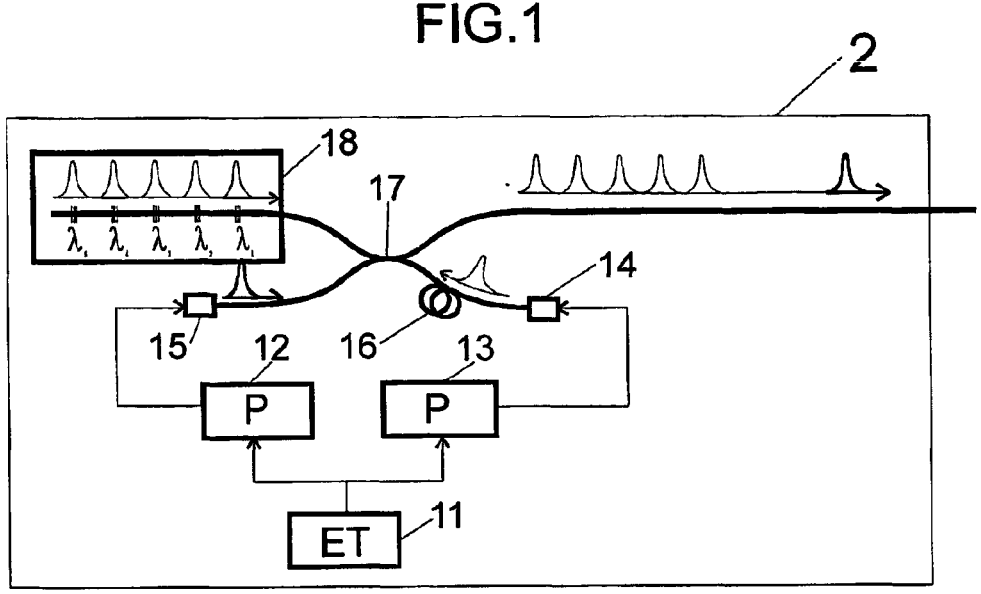
FIG. 1 is a schematic diagram illustrating the operation of the optical source.
Figure 2:
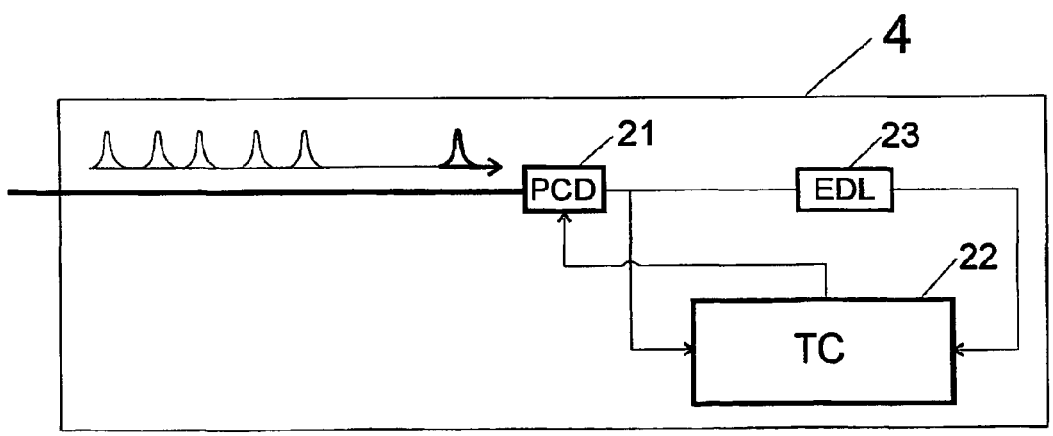
FIG. 2 is a schematic diagram illustrating the operation of the receiver.

Referring now to FIGS. 1 and 2, a first embodiment of the invention is described. In this embodiment, the instrument includes an emitter or source 2, described in FIG. 1 and a receiver 4, described in FIG. 2.

An electronic trigger ("ET") 11 triggers pulsers ("P") 12 and 13 at regular intervals. When triggered by the electronic trigger 11, pulser 12 generates a current pulse, driving laser 15. Concomitantly pulser 13 generates a current pulse, driving the light emitting diode (LED) 14. An optical delay line 16 ensures that the laser pulse precedes the LED pulse in the receiver. The laser pulse goes through coupler 17 directly towards the output. The broadband LED pulse is first sent towards a wavelength selection device 18. This device 18 is made of a series of Bragg gratings, each one reflecting light at a given wavelength, denoted by λ1 to λ5. Note that the number and the values of the wavelengths can be chosen arbitrarily. This device 18 effectively slices out a number of different wavelengths out of the full LED spectrum, and reflects them towards coupler 17 to the output.

Now referring to FIG. 2, the receiver 4 comprises a detector 21, which is an avalanche photodiode (APD) used in two modes in succession: first the standard mode, which detects the laser pulse and then the photon-counting mode, which detects the LED pulse. The photon-counting mode of the APD is enabled by a bias voltage on the diode, sent by the timing circuit ("TC") 22. This time window is triggered by the initial laser pulse arriving on 22. Since the same detector is used for both the laser pulse and the LED pulse, the time delay needed to compensate the initial delay line 16 in the emitter cannot be obtained with an optical delay line, but has to be obtained with the electronic delay line ("EDL") 23.

The above embodiment, however, has its shortcomings. The primary shortcoming is the use of a single detector 21 for detection of both the laser pulse and the LED pulse. This introduces a large noise in the photon-counting detection, which limits the dynamic range of the instrument. This noise is due to the so-called after pulses in the APD. During the detection of a strong pulse, a large number of charged carriers are generated in the APD. Some of these carriers are trapped by defaults in the device and remain there for a while. When the photon-counting mode, with a large bias voltage, is triggered, these trapped carriers are freed. This generates immediately a count; similar to the one obtained when a photon is detected. This effect can be reduced by using a long delay between the laser pulse and the LED. However, compensating this long delay with an electronic delay introduces significant time jitter, which reduces the accuracy of the measurement.

Therefore, it is important to ensure that no strong pulse impinges on the photon-counting detector before the photon-counting mode is enabled. This is obtained in the subsequently described embodiment in which two detectors 41 and 43 are used for detection of the laser pulse.

Now referring to FIGS. 3 and 4, in which a preferred embodiment is shown, an electronic trigger 31 triggers pulsers 32 and 33 at regular intervals, typically every ten microseconds. When triggered by trigger 31, pulser 32 generates a current pulse, driving laser 35. Concomitantly pulser 33 generates a short current pulse, driving LED 34. Typically, the LED pulse lasts about 300 to 500 ps. Such short pulses are needed to obtain the high temporal precision required in chromatic dispersion measurements. An electronic delay line 36 is inserted before the laser 35, to ensure that the LED pulse precedes the laser pulse in the device under test and at the input of the receiver 4' of FIG. 4. An optical coupler 37 mixes the two light pulses. The output of the optical source is thus a series of double optical pulses, first a short LED pulse, with large frequency spectrum, followed by a laser pulse.

Calibration of the instrument is performed by connecting the receiver 4' directly to the source 2' of FIG. 3. The two pulses generated by the source go through coupler 45. The LED pulse enters the wavelength selection device 46. This device is made of a series of Bragg gratings, each one reflecting light at a given wavelength, denoted by λ1 to λ5. Note that the number and the values of the wavelengths can be chosen arbitrarily. This device effectively slices out a number of different wavelengths out of the full LED spectrum, and reflects them towards the photon-counting detector 41, with a given time interval between them, corresponding to the distance between the gratings. The laser pulse is detected by detector 43, which sends the "start" signal to the high-resolution timing circuit 42. Upon reception of this "start" signal, the circuit sends a bias voltage towards the APD, thus enabling the photon-counting mode. The optical delay line 44 is designed to ensure that the photon-counting mode of detector 41 is enabled before the LED optical pulse reflected by 46 arrives in the detector 41. In photon-counting mode, the photon-counting detector 41 behaves essentially as a digital device, giving a single count at the arrival time of the photon. An optical attenuator 47 is set to ensure that no more than one photon is present within the whole series of wavelength-selected pulses. This photon can arrive at random, at any of the times corresponding to the wavelength-selected pulses. The timing of the count provides the "stop" signal for the high-resolution timing circuit 42. The interval "start-stop" gives a delay, which is fed to the counting device 48. Processing a large number of these generates a histogram, with a precise time of detection for each of the selected wavelengths. The time difference between each wavelength, when a source 2' is directly connected to the receiver 4' gives the calibration of the instrument. Note that this calibration needs to be done only once, and does not depend on the source. Therefore, one advantage of this embodiment is that different sources can be used in conjunction with a given receiver, with no need for recalibration of the system.

To perform a measurement, the fiber under test is inserted between the source 2' and the receiver 4'. During the propagation, chromatic dispersion of the fiber under test broadens the LED pulse: each frequency component of the LED takes a slightly different time. This modifies the relative delay between the wavelength-selected pulses generated by the wavelength selection device 46. Comparing the delays obtained with the fiber under test to the calibrated ones directly yields the group delay for each of the selected wavelengths. The chromatic dispersion coefficient can be inferred from the group delay, according to the ITU-T recommendation G.650.

The extreme sensitivity of the photon-counting device, together with the after pulses already mentioned above, require that no light should impinge on detector 41 before the signal from the LED, reflected by the wavelength selecting device 46, arrives on the detector 41. For this reason, the strong laser pulse is delayed in the source, with respect to the LED pulse. In addition, the receiver 4' is designed to avoid any reflection, even from the LED pulse, entering the detector 41 before the signal. For example, some of the LED pulse is split by coupler 45 and is reflected at the end-face of the fiber, before detector 45. The distance between coupler 45 and detector 43 has to be longer than the distance between the detector 45 and the reflectors in the wavelength selection device 46.

Figure 5:
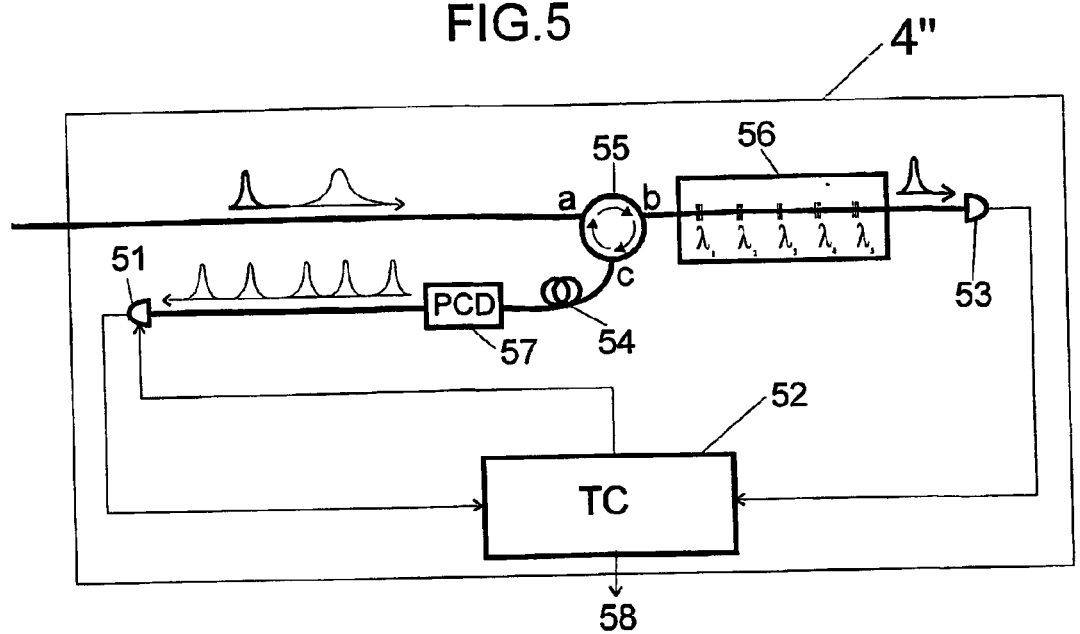
FIG. 5 is a schematic diagram illustrating the operation of the receiver of yet another embodiment of the instrument.

In some cases a very high dynamic range of the device is needed. This is the case for very long optical links, of about 200 km. In this case, it is possible to increase the dynamic range by a modification of the receiver 4", as shown in FIG. 5. This modification requires an extra optical component, making the system more expensive. It is therefore not necessary for most systems.

Now referring to FIG. 5, in which the main difference with FIG. 4 is that the coupler 45 has been replaced by an optical circulator 55, light entering through port a goes to port b, while light entering through port b goes to port c. This device therefore suppresses the loss introduced by the coupler 45 of the previous embodiment. The two pulses generated by the source enter port a of the circulator, and go to port b. The selected wavelengths of the LED pulse are reflected by the wavelength selecting device 56, while the laser pulse is detected in detector 53. In this case, the wavelength of the laser has to be different from all the selected wavelength of the wavelength selecting device 56. The reflected wavelengths enter port b of circulator 55, and go to port c, towards the optical delay line 54, the optical attenuator 57 and the photon-counting detector 51. The timing circuit 52 and the counting device 58 are identical to the high-resolution timing circuit 42 and the counting device 48 respectively.

In an advantage, the invention provides a low cost, fast and reliable measurement of the chromatic dispersion.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An instrument for measuring chromatic dispersion in a subject optical fiber including an optical source and a receiver, wherein:

the optical source for connection to an input end of the subject optical fiber, includes (a) a first pulse producing circuit which drives a laser that produces a laser pulse, the pulse entering the input end of the subject fiber, said laser pulse being used as a timing reference; and (b) a second pulse producing circuit which drives a light emitting diode (LED) which emits a short light pulse with a broad spectrum, which is also coupled to the subject optical fiber;

the receiver including (a) a photodetector, connected at the output end of the subject optical fiber for detecting the laser pulse;

(b) a wavelength-selection element connected to the output end of the subject optical fiber and thus optically connected to the LED, which filters one or several wavelengths out of the LED spectrum of the light pulse and transmits them to photon-counting detector;

(c) the photon-counting detector, connected at the output end of the subject optical fiber, for detection of the filtered LED pulses; and (d) a high resolution timing circuit for measuring the time delay between the laser pulse and the LED pulse, connected to the photodetector at a receiving end of the timing circuit and, connected to the photo-counting detector at a feedback end of the high resolution timing circuit, and, connected to an analysis circuit and an output end of the high resolution timing circuit wherein the analysis circuit is a counting circuit which records the time delays for a large number of pulses.

2. The instrument of claim 1 wherein said wavelength-selection element is a series of several Bragg gratings inscribed in a fiber, thus selecting several fixed wavelengths.

3. The instrument of claim 1 wherein said wavelength-selection element is a tunable filter, whose central wavelength is swept during the measurement.

4. The instrument of claim 3 wherein said tunable filter is a monochromator.

5. The instrument of claim 3 wherein said tunable filter is a Fabry-Perot cavity.

6. The instrument of claim 3 wherein said tunable filter is an acousto-optic element.

7. The instrument of claim 1 wherein said photon-counting detector is an avalanche photodiode (APD), on which a bias voltage is applied during a well-defined time window, thus enabling the photon-counting mode during this window.

8. The instrument of claim 7 further comprising optical and electronic components, such as delay lines, optical filters, optical isolators and optical circulators; said components being chosen to ensure that said photon-counting window is triggered by the detected laser, while ensuring that no light impinges on said photon-counting detector before the signal from the wavelength-selection element.

9. The instrument of claim 8 wherein said components are a delay line in the source, generating a constant time delay between the LED pulse and the laser pulse; and an optical delay line in the receiver; said delay lines being chosen to ensure that the photon-counting window is triggered by the laser pulse, while ensuring that all reflections from said optical pulses, with the exception of the signal from the wavelength-selection element, arrive at the photon-counting detector after the end of the time window.

10. The instrument of claim 1 wherein said high-resolution timing circuit is a time-to-digital-converter.

11. The instrument of claim 1 wherein said counting circuit is an external computer.

12. An instrument for measuring chromatic dispersion in a subject optical fiber transmitting a laser timing pulse, the pulse entering the input end of the subject optical fiber along with a short light LED pulse with a broad spectrum, the instrument comprising a receiver including (a) a photodetector, connected at the output end of the subject optical fiber for detecting the laser pulse;

(b) a wavelength-selection element connected to the output end of the subject optical fiber which filters one or several wavelengths out of the LED spectrum of the light pulse and transmits them to a photon-counting detector;

(c) the photon-counting detector, connected at the output end of the subject optical fiber, for detection of the filtered light pulses; and (d) a high resolution timing circuit for measuring the time delay between the laser pulse and the LED pulse, connected, to the photodetector at a receiving end of the high resolution timing circuit and connected to the photon-counting detector at a feedback end of the high resolution timing circuit, and connected to an analysis circuit at an output end of the high resolution timing circuit wherein the analysis circuit is a counting circuit which records the time delays for a large number of pulses.

13. The instrument of claim 12 wherein said wavelength-selection element is a series of several Bragg gratings inscribed in a fiber, thus selecting several fixed wavelengths.

14. The instrument of claim 12 wherein said wavelength-selection element is a tunable filter, whose central wavelength is sweeped during the measurement.

15. The instrument of claim 14 wherein said tunable filter is a monochromator.

16. The instrument of claim 14 wherein said tunable filter is a Fabry-Perot cavity.

17. The instrument of claim 14 wherein said tunable filter is an acousto-optic element.

18. The instrument of claim 12 wherein said photon-counting detector is an avalanche photodiode (APD), on which a bias voltage is applied during a well-defined time window, thus enabling the photon-counting mode during this window.

19. The instrument of claim 18 further comprising optical and electronic components, such as delay lines, optical filters, optical isolators and optical circulators; said components being chosen to ensure that said photon-counting window is triggered by the detected laser, while ensuring that no light impinges on said photon-counting detector before the signal from the wavelength-selection element.

20. The instrument of claim 12 wherein said high-resolution timing circuit is a time-to-digital-converter.

21. The instrument of claim 12 wherein said counting circuit is an external computer.

* * * * *